(12) United States Patent
Kanemaru et al.

(10) Patent No.: US 10,018,987 B2
(45) Date of Patent: Jul. 10, 2018

(54) NUMERICAL CONTROLLER EXECUTING OPERATION BY A MOVEMENT COMMAND AND TABLE-FORMAT DATA

(71) Applicant: FANUC Corporation, Minamitsuru-gun, Yamanashi (JP)

(72) Inventors: Akira Kanemaru, Minamitsuru-gun (JP); Yasushi Takeuchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 361 days.

(21) Appl. No.: 14/788,927

(22) Filed: Jul. 1, 2015

(65) Prior Publication Data

US 2016/0004245 A1 Jan. 7, 2016

(30) Foreign Application Priority Data

Jul. 4, 2014 (JP) .................................. 2014-138687

(51) Int. Cl.
*G05B 19/402* (2006.01)
*G05B 15/02* (2006.01)
(52) U.S. Cl.
CPC .......... *G05B 19/402* (2013.01); *G05B 15/02* (2013.01); *G05B 2219/34083* (2013.01); *G05B 2219/34153* (2013.01)
(58) Field of Classification Search
CPC ................. G05B 15/02; G05B 19/402; G05B 2219/34083; G05B 2219/34153
USPC ........................................................ 700/275
See application file for complete search history.

(56) References Cited

U.S. PATENT DOCUMENTS

| 4,692,856 A | 9/1987 | Komiya | |
|---|---|---|---|
| 6,662,073 B1 * | 12/2003 | Fujishima | G05B 19/4069 700/109 |
| 6,862,492 B2 * | 3/2005 | Sagasaki | G05B 19/4067 318/565 |

(Continued)

FOREIGN PATENT DOCUMENTS

| CN | 101770220 A | 7/2010 |
|---|---|---|
| CN | 102375432 A | 3/2012 |

(Continued)

OTHER PUBLICATIONS

Notification of Reasons for Refusal dated Dec. 20, 2016 in Japanese Patent Application No. 2014-138687 (2 pages) with an English translation (2 pages).

(Continued)

*Primary Examiner* — Chun Cao
(74) *Attorney, Agent, or Firm* — Drinker Biddle & Reath LLP (57) ABSTRACT

A numerical controller drives motors for respective axes of a machine tool by using an NC program and table-format data that command positions of those axes with reference to a position of a reference axis. The numerical controller generates, based on a movement command commanded by the NC program, interpolation data for an axis to be controlled by the movement command, generates, based on the table-format data, interpolation data for an axis to be controlled by the table-format data, and further generates interpolation data obtained by selection from or superposition of these two pieces of interpolation data.

2 Claims, 9 Drawing Sheets

(56) References Cited

U.S. PATENT DOCUMENTS

| | | |
|---|---|---|
| 2003/0191553 A1 | 10/2003 | Isohata |
| 2005/0209712 A1 | 9/2005 | Sagasaki et al. |
| 2009/0125139 A1 | 5/2009 | Endo et al. |
| 2016/0349732 A1* | 12/2016 | Kimata ................ G05B 19/404 |

FOREIGN PATENT DOCUMENTS

| | | |
|---|---|---|
| JP | S59-177604 A | 10/1984 |
| JP | S62-228353 A | 10/1987 |
| JP | H09-230916 A | 9/1997 |
| JP | 2003-303005 A | 10/2003 |
| JP | 4119372 B2 | 7/2008 |
| JP | 2009-122852 A | 6/2009 |

OTHER PUBLICATIONS

First Chinese Office Action dated Dec. 14, 2017 issued in corresponding Chinese patent application No. 201510388793.3 (5 pages) and its English-language translation thereof (7 pages).

\* cited by examiner

MACHINE TOOL A

REQUIRED TIME: 980 msec
EXECUTED AFTER 980 msec ⇒

MACHINE TOOL B

REQUIRED TIME: 1025 msec
EXECUTED AFTER 1025 msec ⇒

REQUIRED TIME: 1025 msec

```
O0302;
:
M1234 Q0302;     (1)
G00 Y0.0;        (2)
:
Y100.0;          (3)
:
M99;
```

```
<TIME_TABLE_0302_M>
R98;             (4)
:
L1000.0 M567;    (7)
R99;
```

NUMERICAL CONTROLLER EXECUTING OPERATION BY A MOVEMENT COMMAND AND TABLE-FORMAT DATA

RELATED APPLICATION DATA

This application claims priority under 35 U.S.C. § 119 and/or § 365 to Japanese Application No. 2014-138687 filed Jul. 4, 2014, the entire contents is incorporated herein by reference.

BACKGROUND OF THE INVENTION

1. Field of the Invention

The present invention relates to a numerical controller and more particularly to a numerical controller that executes operation by table-format data.

2. Description of the Related Art

As a method of controlling drive of each control axis individually in synchronization with operation of a reference axis, an operation function with table-format data is well-known by which position information for the control axes is stored in association with a reference axis position in the table-format data provided in a memory or the like and each control axis is operated synchronously with the reference axis based on the information stored in the table-format data.

The table-format data in which an axis position or auxiliary function such as an M code, corresponding to time, an axis position, a spindle position is set, is stored in the memory or a storage device connected with a network, and each axis and the auxiliary function are controlled while the table-format data is read sequentially.

As an example of a prior art technique that proposes such a function, a technique is known by which a position of a movable axis for each time point or each rotation angle is stored as numerical control data, the time points or the rotation angles are monitored, and the numerical control data associated with the movable axis is output each time any of the stored time points or rotation angles is reached (for example, see Japanese Patent Application Laid-Open No. 59-177604).

In addition, an invention is also known by which a data table in which commanded positions of an X axis and a Z axis with respect to a reference position are stored is provided, the reference position is obtained by applying an override value to a value of a counter that counts reference pulses, and the commanded positions of the X axis and the Z axis stored in the data table are output based on the obtained reference position to synchronously control the X axis and the Z axis, thereby enabling an override to be applied even when the drive of axes are controlled by the data stored in the data table, and further, enabling commanded positions to be linearly connected, or connected by quadratic function, cubic function, or the like, and also enabling an auxiliary function to be commanded (for example, see Japanese Patent Application Laid-Open No. 2003-303005).

According to the inventions described in Japanese Patent Application Laid-Open No. 59-177604 and Japanese Patent Application Laid-Open No. 2003-303005 above, it is possible to execute free tool operation irrespective of a machining program, achieving shorter machining time and higher machining accuracy.

Figure 12:
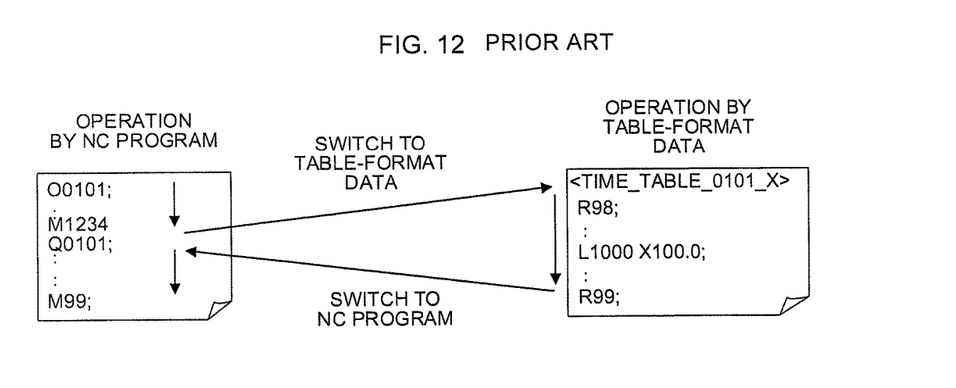
FIG. 12 illustrates an general idea of executing operation by an NC program and operation by table-format data in a switched manner in a prior art technique.

However, in numerical controllers in a prior art technique, there is a problem in that methods of preprocessing and interpolation in operation by table-format data are different from methods of preprocessing and interpolation in operation by an NC program, there is no means of integrating respective interpolation results, and therefore the operation by the table-format data and the operation by the NC program cannot be executed simultaneously in the same path. In a prior art technique, when the operation by the NC program and the operation by the table-format data are executed, control is performed by switching to the operation by the table-format data with the M code or the like while the operation by the NC program is executed, depending on a machining status or machining details in the path, as illustrated in FIG. 12.

Figure 13:
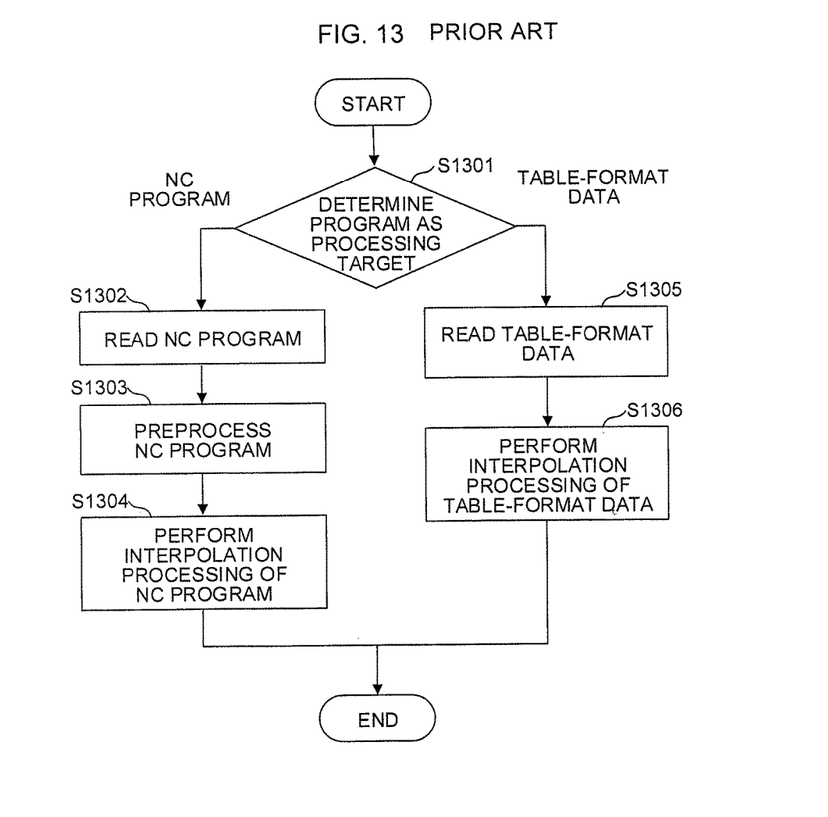
FIG. 13 is a flowchart of execution processing of switching between an operation by an NC program and an operation by table-format data.

FIG. 13 is a flowchart illustrating processing by a numerical controller executing such operation switching (operation switching execution processing).

[Step S1301] When the operation switching execution processing is started, whether a program to be currently processed is an NC program or table-format data is first determined. If the program to be currently processed is determined to be an NC program, the flow proceeds to S1302. If the program to be currently processed is determined to be table-format data, the flow proceeds to S1305.

[Step S1302] The NC program as the processing target is read.

[Step S1303] A block as a processing target is retrieved from the NC program and preprocessed.

[Step S1304] A distribution movement amount to be commanded for a movable part of each axis for each distribution period of the block as the processing target is obtained and interpolation processing is performed.

[Step S1305] The table-format data as the processing target is read. The table-format data to be read is preprocessed table-format data.

[Step S1306] Interpolation processing for a control-target axis is performed based on a reference axis position by using the read table-format data and an interpolation result is output.

Thus, in the processing methods in a prior art technique, the operation by the NC program and the operation by the table-format data cannot be executed simultaneously. Therefore, the operation is executed by switching between the operation by the table-format data and the operation by the NC program, depending on the machining status or the machining details in the path, and a specific axis cannot be exclusively controlled according to actual time by the table-format data during the operation by the NC program.

In addition, in the operation by the table-format data in a prior art technique, there is no means of referring to an interpolation result for an axis controlled by the NC program, and the axis controlled by the NC program cannot be specified as a reference axis to be used in the table-format data. Accordingly, there is no means of achieving synchronization between an axis controlled by the table-format data and an axis controlled by the NC program and it is not possible to enable an operation of the axis controlled by the table-format data to follow an operation of the axis controlled by the NC program.

SUMMARY OF THE INVENTION

An object of the present invention is to provide a numerical controller that includes a means of simultaneously executing operation by table-format data and operation by an NC program in the same path and a means of achieving synchronization between an axis controlled by the table-format data and an axis controlled by the NC program.

A numerical controller according to the present invention drives a motor for each axis of a machine tool by using an NC program and table-format data that specifies a position of each axis with reference to time or a position of a reference axis. The numerical controller includes: a first interpolation data generation unit that generates, based on a movement command commanded by the NC program, first interpolation data that is interpolation data for an axis to be controlled by the movement command; a second interpolation data generation unit that generates, based on the table-format data, second interpolation data that is interpolation data for an axis to be controlled by the table-format data; and a third interpolation data generation unit that generates third interpolation data obtained by selection from or superposition of the first interpolation data generated by the first interpolation data generation unit and the second interpolation data generated by the second interpolation data generation unit.

The numerical controller may further include a reference value conversion unit that converts the first interpolation data generated by the first interpolation data generation unit to a reference value of the reference axis to be used in the table-format data.

According to the present invention, a specific axis is controlled by the table-format data during operation by the NC program, thereby enabling operation of a specific axis to be overlapped at any timing irrespective of a command block or a specific axis to be advanced in machining of a corner portion. Therefore, machining time can be shortened and more complicated geometric machining can be achieved.

Moreover, an auxiliary function such as an M code can be controlled, with respect to time and therefore external device control or the like can be performed at specified time even if there is a difference in a progress status of the NC program due to individual differences in machine tools.

In addition, control targets by programs are classified, in the form of control of a basic axis that performs main machining by the NC program, control of a peripheral axis by the table-format data, and the like. Therefore, programs creation becomes easier and maintainability is increased.

BRIEF DESCRIPTION OF THE DRAWINGS

The above and other objects and features of the present invention will be apparent from the following description of an embodiment with reference to the appended drawings, in which.

DETAILED DESCRIPTION OF THE PREFERRED EMBODIMENTS

Figure 1:
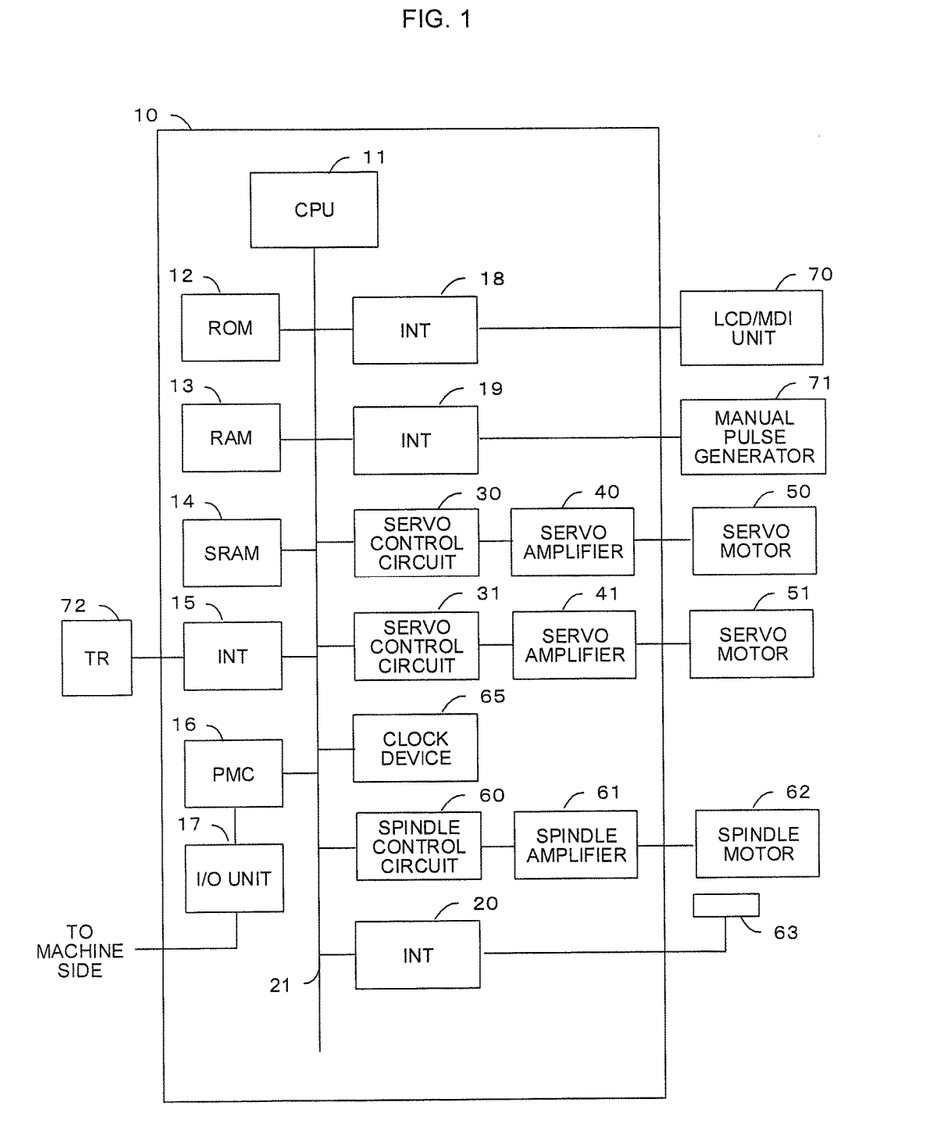
FIG. 1 is a main unit block diagram illustrating an aspect of a numerical controller for driving a machine tool according to the present invention.

FIG. 1 is a main unit block diagram illustrating an aspect of a numerical controller for controlling a machine tool according to the present invention.

A CPU 11 is a processor that totally controls a numerical controller 10. The CPU 11 reads, via a bus 21, a system program stored in a ROM 12 and totally controls the numerical controller 10 according to the read system program. In a RAM 13, temporary calculation data or display data, and various type of data input by an operator via an LCD/MDI unit (manual data input device with a liquid crystal display) 70 are stored. An SRAM memory 14 is configured as a non-volatile memory which is backed up by a battery (not shown) and in which a storage state is retained even after the power to the numerical controller 10 is turned off. In the SRAM memory 14, for example, a machining program read via an interface 15 and a machining program input via the LCD/MDI unit 70 are stored. In the SRAM memory 14, the above-mentioned table-format data for operating any axis is also stored in advance. In the ROM 12, various system programs for performing edit-mode processing required for creation and editing of machining programs and processing for automatic operation are written in advance.

An interface 19 is connected to a manual pulse generator 71. The manual pulse generator 71 is mounted on a control panel of a machine tool and used to precisely position a movable part of the machine tool in control of each axis by a distribution pulse based on a manual operation.

The interface 15 enables connection between the numerical controller 10 and an external device 72. A programmable machine controller (PMC) 16 outputs, via an I/O unit 17, a signal to an auxiliary device of the machine tool by a sequence program incorporated in the numerical controller 10, and controls the auxiliary device. Also, the PMC 16 receives signals from various switches etc. of the control panel disposed on the machine tool main body, performs necessary signal processing, and then passes the processed signals to the CPU 11.

Servo control circuits 30 and 31 for each axis receive instructions indicating an amount of movement command of each axis from the CPU 11 and output the command for each axis to servo amplifiers 40 and 41. The servo amplifiers 40 and 41 receive the commands and drive servo motors 50 and 51 for each axis. The servo motors 50 and 51 for each axis incorporate respective position/speed detectors, feed position/speed feedback signals from the position/speed detectors back to the servo control circuits 30 and 31, and perform position/speed feedback control. The position/speed feedback is omitted in FIG. 1.

A spindle control circuit 60 receives a spindle command and outputs a spindle speed signal to a spindle amplifier 61. The spindle amplifier 61 receives the spindle speed signal and rotates a spindle motor 62 for driving the spindle at the commanded rotation speed. A position detector 63 feeds a feedback pulse (reference pulse) and a one-rotation signal to the spindle control circuit 60 and controls the speed in synchronization with spindle rotation. Reference numeral 65 denotes a clock device that is adjusted to synchronize with a current time of day.

Although the numerical controller 10 illustrated in FIG. 1 has two control axes, it should be appreciated that the numerical controller 10 may have three or more control axes.

Figure 2:
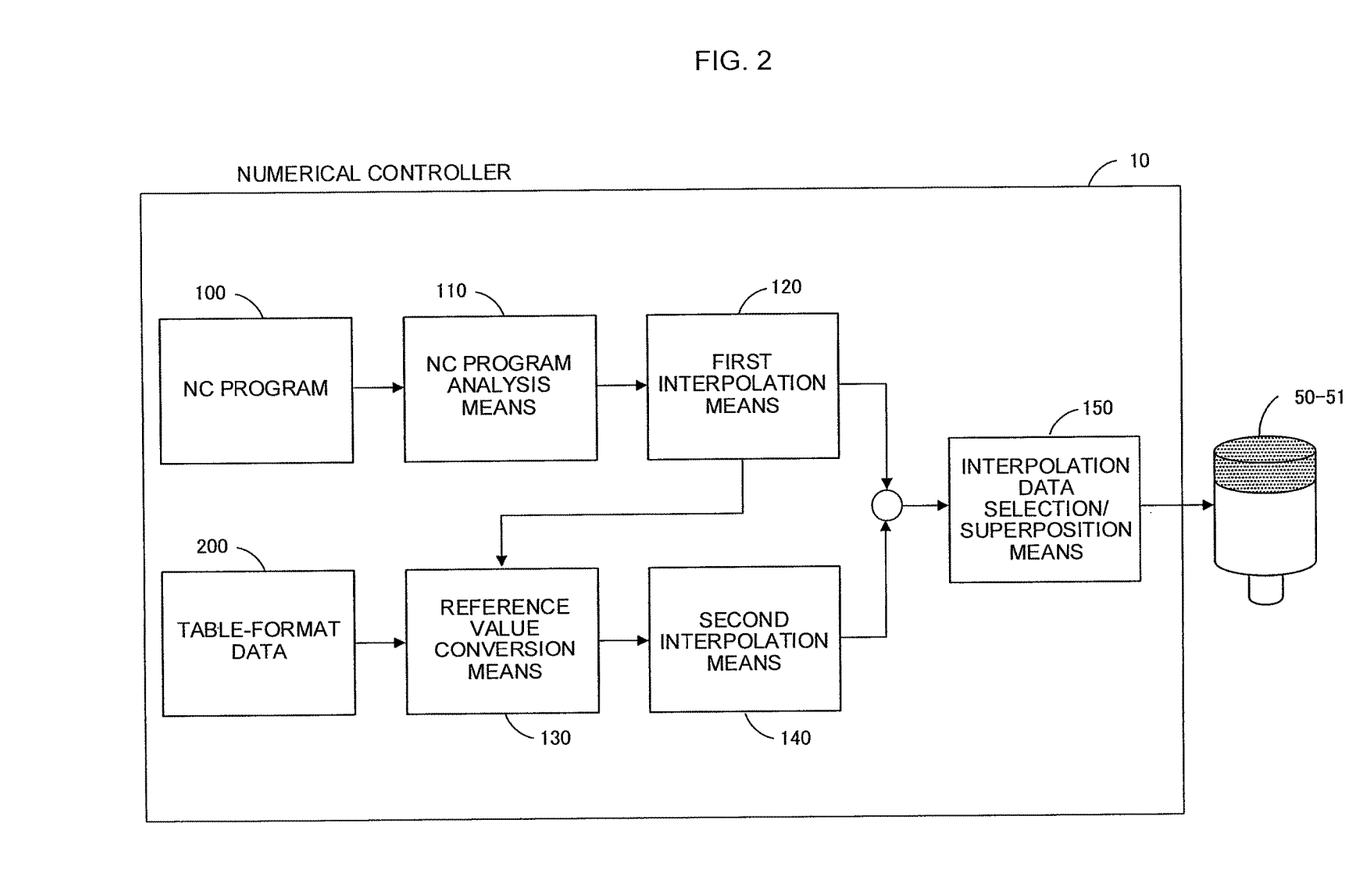
FIG. 2 is a functional block diagram illustrating an embodiment of the numerical controller according to the present invention.

FIG. 2 is a functional block diagram illustrating an embodiment of the numerical controller 10 according to the present invention.

The numerical controller 10 includes an NC program analysis means 110, a first interpolation means 120, a reference value conversion means 130, a second interpolation means 140, and an interpolation data selection/superposition means 150. The NC program analysis means 110 reads an NC program 100 stored in a memory (not shown), analyzes the read NC program 100, and acquires a movement command. The first interpolation means 120 performs interpolation processing for determining many interpolation points along an operation path based on the movement command obtained through the analysis by the NC program analysis means 110 and temporarily stores interpolation data (first interpolation data) created by the interpolation processing in another memory (not shown). The reference value conversion means 130 reads preprocessed table-format data 200 stored in the memory (not shown) and acquires the first interpolation data created by the first interpolation means 120. When a reference axis specified in the table-format data 200 is controlled by the NC program, the reference value conversion means 130 converts the first interpolation data created by the first interpolation means 120 to a reference value for the table-format data 200. The second interpolation means 140 performs interpolation processing for a control-target axis based on a reference axis position by using the table-format data acquired from the reference value conversion means 130 and temporarily stores interpolation data (second interpolation data) created by the interpolation processing in the other memory (not shown).

Based on the first interpolation data and the second interpolation data stored in the memory by the first interpolation means 120 and the second interpolation means 140, respectively, the interpolation data selection/superposition means 150 selects either the first interpolation data or the second interpolation data based on which the path is controlled, superposes the first interpolation data and the second interpolation data, or performs other processing. The interpolation data selection/superposition means 150 controls servo motors based on interpolation data (third interpolation data) created by the selection/superposition. The interpolation data selection/superposition means 150 may be configured to dynamically decide to select the first interpolation data or the second interpolation data or superpose the first interpolation data and the second interpolation data during machining, based on a status of settings made in the numerical controller 10, a command in the NC program or the table-format data, or machining status information obtained via a sensor or the like.

In this case, either the first interpolation data (axis control by the NC program) or the second interpolation data (axis control by the table-format data) may be selected on a priority basis, depending on the setting status or the machining status. Moreover, compensation data for the NC program may be set in the table-format data, and the second interpolation data may be superposed on the first interpolation data depending on the setting status or the machining status.

Figure 3:
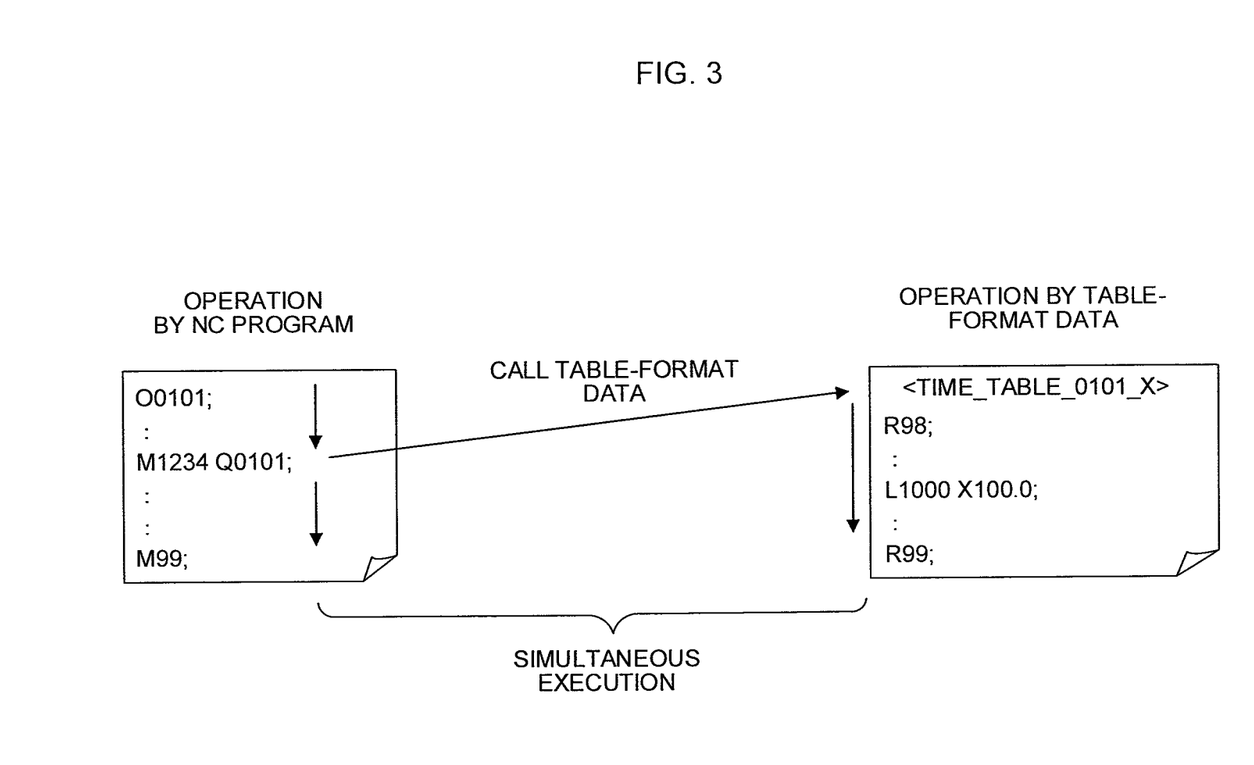
FIG. 3 illustrates a general idea of simultaneously executing operation by an NC program and operation by table-format data in the embodiment of the present invention.

Operation by an NC program and operation by table-format data, which could only be selectively executed according to a prior art technique, can be executed simultaneously by the numerical controller 10 including the above functions, as illustrated in FIG. 3.

Figure 4:
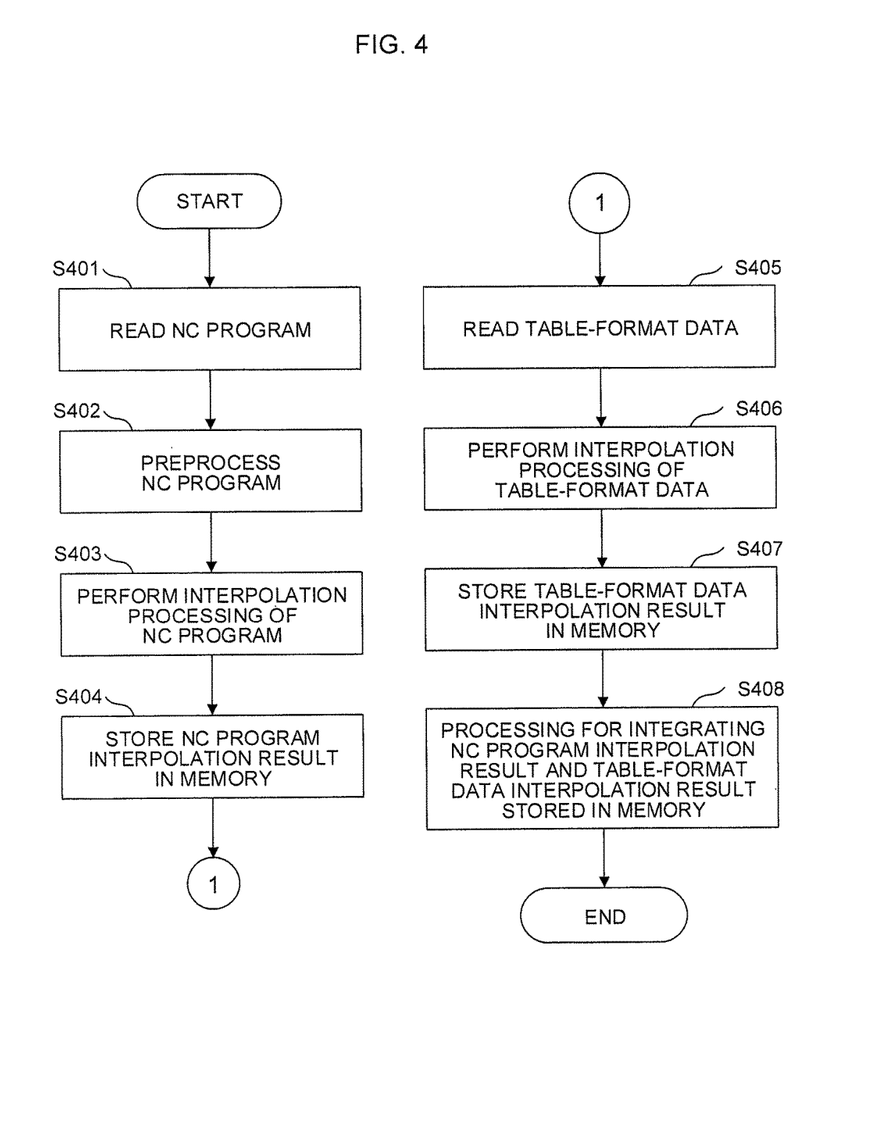
FIG. 4 is a flowchart illustrating processing for simultaneously executing an NC program and table-format data by the numerical controller in FIG. 2.

FIG. 4 is a flowchart illustrating processing (simultaneous operation execution processing) for simultaneously executing operation by an NC program and operation by table-format data by the numerical controller 10 in FIG. 2. Note that the flowchart illustrates a flow of the processing when a reference axis specified in the table-format data 200 is not controlled by the NC program.

[Step S401] The NC program as a processing target is read.

[Step S402] A block as a processing target is retrieved from the NC program and preprocessed.

[Step S403] A distribution movement amount of the block as the processing target, which is commanded to a movable part of each axis for each distribution period, is obtained and interpolation processing is performed.

[Step S404] A result of the interpolation processing obtained in step S403 is stored in a memory as first interpolation data.

[Step S405] The table-format data as a processing target is read. Note that the table-format data to be read is preprocessed table-format data.

[Step S406] Interpolation processing for a control-target axis is performed based on a reference axis position by using the table-format data read in step S405.

[Step S407] A result of the interpolation processing obtained in step S406 is stored in the memory as second interpolation data.

[Step S408] Interpolation data stored in step S404 and interpolation data stored in step S407 are acquired, and then selection of which program (NC program or table-format data) is to be used to control the axis in a path and superposition of the interpolation data in both programs (NC program and table-format data) are performed, thereby outputting the interpolation processing result as third interpolation data, and the simultaneous operation execution processing is ended.

Figure 5:
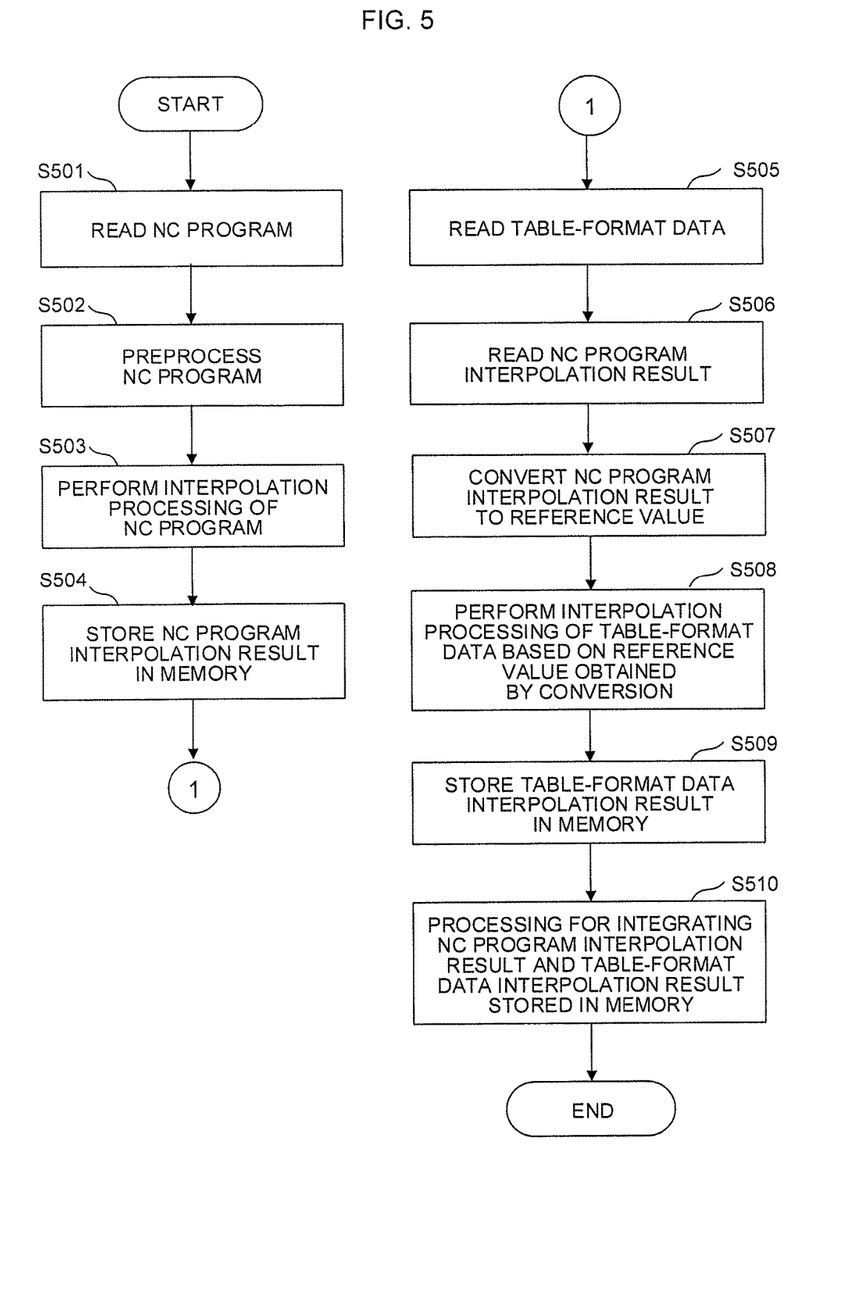
FIG. 5 is a flowchart illustrating processing for synchronously executing an NC program and table-format data by the numerical controller in FIG. 2.

FIG. 5 is a flowchart illustrating processing (axis operation processing) for operating an axis controlled by table-format data with a control axis controlled by an NC program as a reference axis, in simultaneous processing for operation by the NC program and operation by the table-format data by the numerical controller 10 in FIG. 2.

[Step S501] The NC program as a processing target is read.

[Step S502] A block as a processing target is retrieved from the NC program and preprocessed.

[Step S503] A distribution movement amount of the block as the processing target, which is commanded to a movable part of each axis for each distribution period, is obtained and interpolation processing is performed.

[Step S504] A result of the interpolation processing obtained in step S503 is stored in a memory as first interpolation data.

[Step S505] The table-format data as a processing target is read. Note that the table-format data to be read is preprocessed table-format data.

[Step S506] The first interpolation data recorded in the memory in step S504 is acquired.

[Step S507] The first interpolation data acquired in step S506 is converted to a reference value of a reference axis to be used in the table-format data.

[Step S508] Interpolation processing for a control-target axis based on a reference axis position is performed by using the reference value obtained by the conversion in step S507 and the table-format data read in step S505. [Step S509] A result of the interpolation processing obtained in step S508 is stored in the memory as second interpolation data.

[Step S510] Interpolation data stored in step S504 and interpolation data stored in step S509 are acquired, and then selection of which program (NC program or table-format data) is to be used to control the axis in a path and superposition of the interpolation data in both programs (NC program and table-format data) are performed, thereby outputting the interpolation processing result as third interpolation data, and the axis operation processing is ended.

Thus, the numerical controller according to the present invention enables simultaneous execution of operation by table-format data and operation by an NC program in the same path. The numerical controller includes means for separately storing interpolation result of the NC program and interpolation result of the table-format data and means for integrating these interpolation results into one. The numerical controller, avoiding the trouble of determination and branch processing that have been carried out in a prior art technique, is configured to perform interpolation of the table-format data after interpolation of the NC program. The numerical controller enables selection of which program is used to control an axis in the path or superposition of the results of interpolation of both programs.

In addition, the numerical controller according to the present invention enables synchronization between an axis controlled by the table-format data and an axis controlled by the NC program. The numerical controller includes means for reading a stored interpolation result of the NC program before interpolation of the table-format data and converting the interpolation result to a reference value of a table-format data, thereby enabling interpolation of the table-format data with reference to coordinates of the axis operated by the NC program.

Effects of control processing with the numerical controller according to the present invention will be described with reference to FIGS. 6 to 9.

Figure 6:
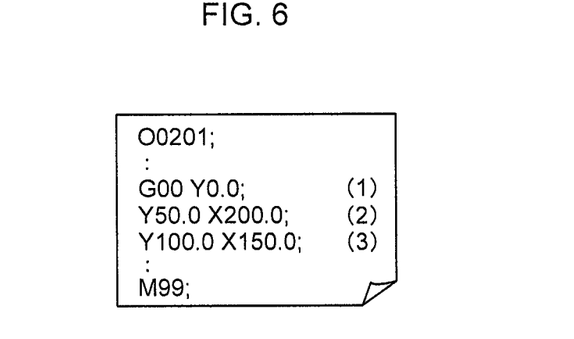
FIG. 6 illustrates an example of an NC program in a prior art technique.

In a conventional operation method by an NC program, an axis decelerates or stops at a block end due to a fast-forward overlap or in-position check setting or the like. Therefore, in the conventional operation method, when an NC program O0201 illustrated in FIG. 6 is created, a Y axis and an X axis temporarily decelerate or stop upon completion of a command block of Y50.0, X200.0 (2) in the NC program O0201 and then start to move to Y100.0, X150.0 (3), as in graphs illustrated in FIG. 7. Reference numerals (1), (2), and (3) in the graphs in FIG. 7 denote axis positions (1), (2), and (3) indicated by commands in the NC program in FIG. 6, respectively.

In contrast, in axis control by means of the numerical controller according to the present invention, it is possible to avoid this type of control axis deceleration or stop.

Figure 8:
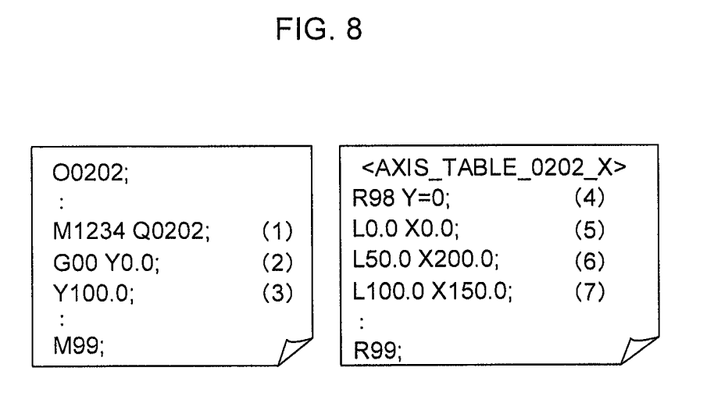
FIG. 8 illustrates examples of an NC program and table-format data.
Figure 9:
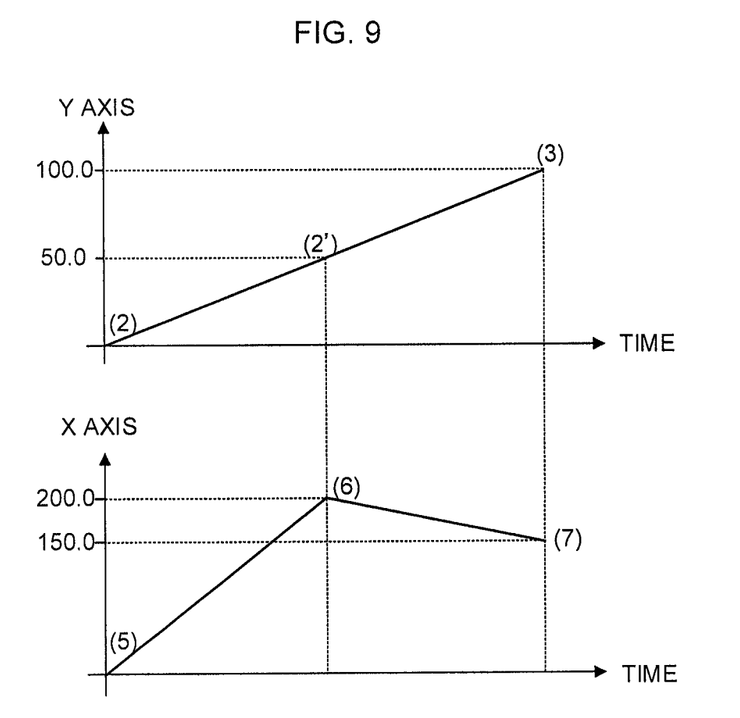
FIG. 9 illustrates operation of a control axis when the NC program and the table-format data in FIG. 8 are executed by the numerical controller according to the present invention.

FIG. 9 includes graphs illustrating operations of X axis and Y axis when an NC program O0202 and table-format data <AXIS_TABLE_0202_X> illustrated in FIG. 8 are simultaneously operated by the numerical controller according to the present invention and operation of the X axis controlled by the table-format data is synchronized with operation of the Y axis controlled by the NC program. Reference numerals (2), (3), (5), (6), and (7) in the graphs in FIG. 9 denote axis positions (2), (3), (5), (6), and (7) indicated by instructions in the NC program O0202 and the table-format data <AXIS_TABLE_0202_X> in FIG. 8, respectively.

In FIG. 8, in the NC program O0202, M1234 indicates an M code for starting execution of the table-format data and Q0202 indicates the number of the table-format data to be executed. In the table-format data <AXIS_TABLE_0202_X>, R98 and R99 indicate a header and a footer of the table-format data, respectively, L indicates coordinate values of a reference axis, and X indicates coordinate values of an axis to be controlled. Y=0 indicates that the Y axis is specified as the reference axis.

After M code (1) for starting the table-format data in the NC program O0202 is executed, the Y axis is positioned at 0.0 (2) and moved to 100.0 (3). When the M code for starting the table-format data in the NC program O0202 is executed, the Y axis is set as the reference axis from Y=0 (4) contained in the header section in the table-format data <AXIS_TABLE_0202_X> and operation of the X axis is controlled with reference to the coordinates of the Y axis. The X axis is operated in a manner such that it moves to 0.0 (5) while the Y axis is positioned at 0.0 (2) and is positioned at 200.0 (6) and 150.0 (7) in synchronization with movement of the coordinates of the Y axis to 50.0 (2') and 100.0 (3), respectively.

Figure 7:
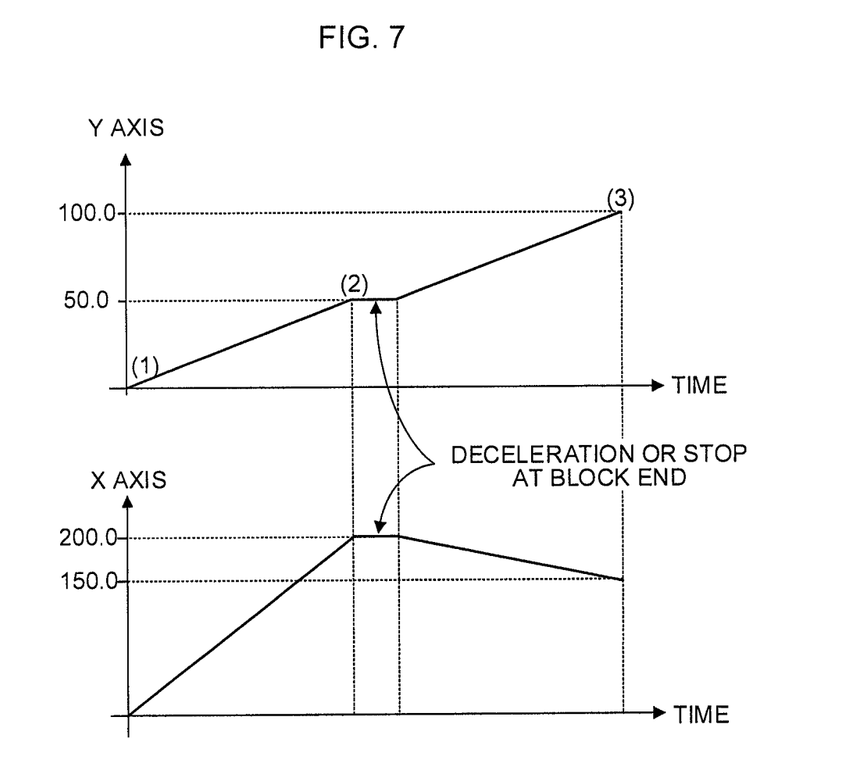
FIG. 7 illustrates operation of a control axis when the NC program in FIG. 6 is executed.

Accordingly, it is clear from FIG. 9 that when the NC program and the table-format data are synchronized with each other by the numerical controller according to the present invention, the X axis moves from 0.0 (5) to 200.0 (6) and from 200.0 (6) to 150.0 (7) while the Y axis moves from 0.0 (2) to 100.0 (3) at a constant speed (without decelerating and stopping as illustrated in FIG. 7 (prior art technique)).

Thus, the numerical controller according to the present invention causes operation of a specific axis to be overlapped at any timing irrespective of a command block by controlling the specific axis by the table-format data during operation by the NC program, thereby enabling an axis to move without deceleration or stoppage at a block end of the NC program.

Similarly, when the numerical controller according to the present invention is applied to, for example, machining of a corner portion, it is possible to shorten machining time and achieve more complicated geometric machining by advancing a specific axis.

Other effects of control processing with the numerical controller according to the present invention will be described with reference to FIGS. 10A to 10C and 11.

In a conventional operation method by an NC program, there is a temporal difference in an execution status of a command block due to individual differences in machine tools or change in machining status arising from a weight of a workpiece or the like. Therefore, even in a case where it is necessary to output an auxiliary function at a predetermined time from the start of machining, there are variations in a timing at which the auxiliary function is actually output, depending on the execution status of the command block.

Figure 10A:
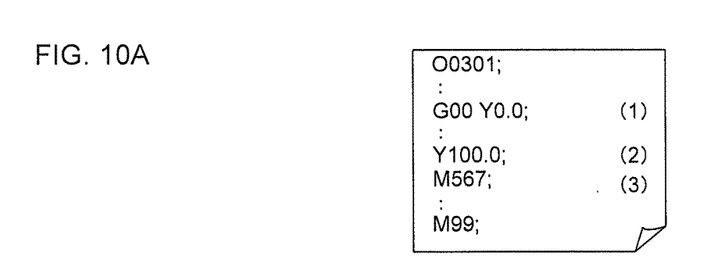
FIGS. 10A to 10C illustrate a problem due to individual differences in machine tools during execution of an NC program in a prior art technique.

For example, in a case where an auxiliary function M567 for operating a cooling system is to be output after elapse of actual time of 1000 msec after execution of a command block of G00 Y0.0 (1) in an NC program in FIG. 10A, M567 (3) is inserted in a block next to Y100.0 (2) based on average machining time.

Figure 10B:
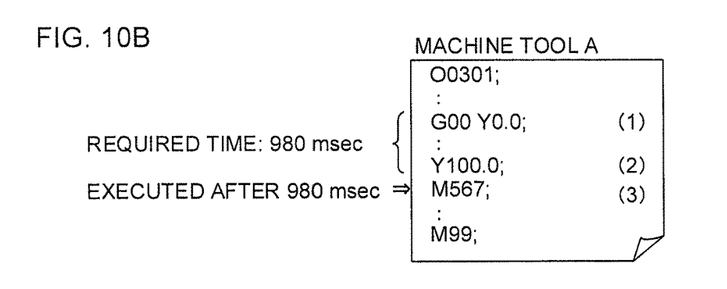
Figure 10C:
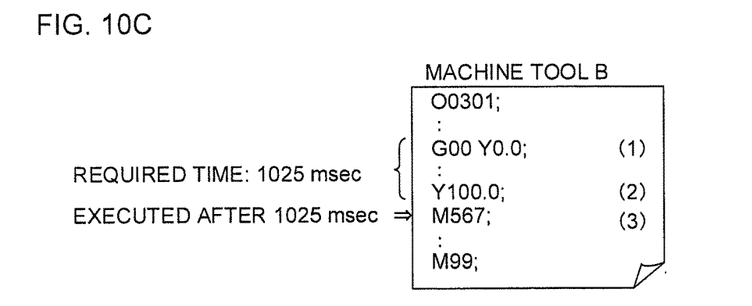

However, due to individual differences in machine tools or because of other reasons, time required until the block of Y100.0 (2) is completed in a machine tool A may be 980 msec as illustrated in FIG. 10B, whereas time required until the block of Y100.0 (2) is completed in another machine tool B may be 1025 msec as illustrated in FIG. 10C, for example. In this case, it is impossible to output the auxiliary function exactly after actual time of 1000 msec.

In contrast, in axis control by means of the numerical controller according to the present invention, an auxiliary function such as an M code is controlled with respect to time during operation by an NC program, thereby enabling the auxiliary function to be output exactly in actual time irrespective of an operation status of the NC program.

Figure 11:
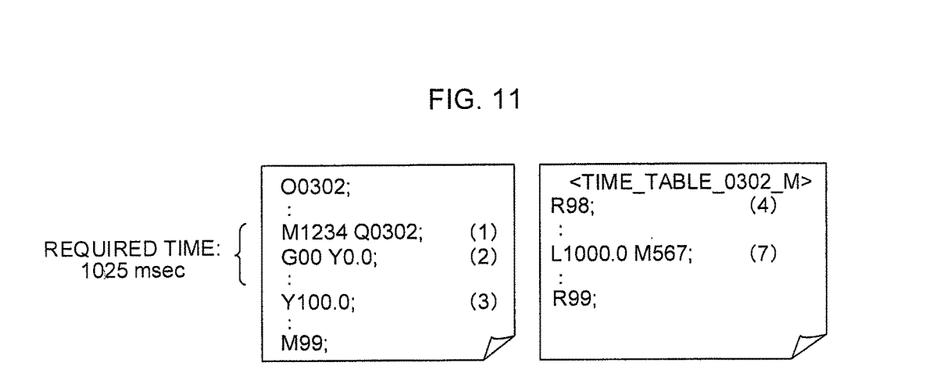
FIG. 11 illustrates an example of time-specified control action by the numerical controller according to the present invention.

An example will now be described in which an NC program O0302 and table-format data <TIME_TABLE_0302_M> are simultaneously operated by a control method with the numerical controller according to the present invention. In the NC program, M1234 is an M code for starting execution of the table-format data and Q0302 indicates the number of the table-format data to be executed. In the table-format data, R98 and R99 indicate a header and a footer of the table-format data, respectively, and L indicates reference time (unit: msec).

After M code (1) for starting the table-format data in the NC program is executed, subsequent command blocks are executed sequentially. When the M code for starting the table-format data in the NC program is executed, counting of the reference time in the table-format data is started, and M567 is output after 1000 msec.

Therefore, after M code (1) for starting the table-format data is executed, that is, after execution of a command block of G00 Y0.0 (1) is started, the auxiliary function M567 can be output reliably after actual time of 1000 msec, even if time required until the block of Y100.0 (2) is completed is 1025 msec.

Thus, in the present invention, an auxiliary function such as an M code can be controlled with respect to time, and therefore external device control or the like can be performed at specified time even if there is a difference in a progress status of the NC program due to individual differences in machine tools.

The invention claimed is:

1. A numerical controller (NC) that drives a motor for each axis of a machine tool by using an NC program and table-format data that commands a position of each axis with reference to time or a position of a reference axis, the numerical controller comprising:
   non-transitory computer readable memory;
   one or more hardware processors coupled to the non-transitory memory and configured to read instructions from the non-transitory memory to cause the numerical controller to perform operations comprising:
   generating, based on a movement command commanded by the NC program, first interpolation data that is interpolation data for an axis to be controlled by the movement command;
   generating, based on the table-format data, second interpolation data that is interpolation data for an axis to be controlled by the table-format data;
   generating third interpolation data obtained by superposition of the first interpolation data and the second interpolation data and
   simultaneously processing for operation the NC program and the table-format data based upon the third interpolation data to drive one or more of the motors for each axis of the machine tool.

2. The numerical controller according to claim 1, wherein the operations further comprise converting the first interpolation data to a reference value of the reference axis to be used in the table-format data.

* * * * *